United States Patent
Philipson

(12) 
(10) Patent No.: US 6,499,745 B2
(45) Date of Patent: Dec. 31, 2002

(54) SOLID SEALANT WITH ENVIRONMENTALLY PREFERABLE CORROSION RESISTANCE

(75) Inventor: Joseph Philipson, Pasadena, CA (US)

(73) Assignee: Hi-Shear Corporation, Torrance, CA (US)

(*) Notice: Subject to any disclaimer, the term of this patent is extended or adjusted under 35 U.S.C. 154(b) by 0 days.

(21) Appl. No.: 09/978,943

(22) Filed: Oct. 15, 2001

(65) Prior Publication Data

US 2002/0043773 A1 Apr. 18, 2002

Related U.S. Application Data

(62) Division of application No. 09/198,741, filed on Nov. 24, 1998, now Pat. No. 6,315,300.

(51) Int. Cl.$^7$ ................................. F16T 15/08
(52) U.S. Cl. ...................... 277/650; 277/523
(58) Field of Search ....................... 277/523, 650; 401/1, 4; 52/309.8; 106/218; 156/441.5

(56) References Cited

U.S. PATENT DOCUMENTS

| | | | | |
|---|---|---|---|---|
| 4,092,198 A | * | 5/1978 | Scher et al. | 156/222 |
| 4,232,496 A | * | 11/1980 | Warkentin | 277/180 |
| 4,495,466 A | * | 1/1985 | Lakin | 324/242 |
| 4,537,824 A | * | 8/1985 | Asano et al. | 428/323 |
| 4,551,483 A | * | 11/1985 | Hicks | 521/103 |
| 4,637,619 A | * | 1/1987 | Stansberry | 277/167.5 |
| 4,640,978 A | * | 2/1987 | Kilbane et al. | 174/23 R |
| 5,057,545 A | * | 10/1991 | Muhl et al. | 521/103 |
| 5,224,315 A | * | 7/1993 | Winter | 52/309.8 |
| 5,288,797 A | * | 2/1994 | Khalil et al. | |
| 5,373,674 A | * | 12/1994 | Winter | 52/309.9 |
| 5,654,012 A | * | 8/1997 | Lutey | |
| 6,059,867 A | * | 5/2000 | Lewis et al. | 106/14.44 |

* cited by examiner

Primary Examiner—Anthony Knight
Assistant Examiner—Mark Williams
(74) Attorney, Agent, or Firm—Fulwider Patton Lee & Utecht, LLP

(57) ABSTRACT

The faying surface of one or of both of a pair of substrates is provided with a layer of solid polyurethane sealant which is adherent to at least one of the respective surfaces. The substrates are additionally fastened together so that the faying surfaces compress the polyurethane sealant between them to form a fluid seal across the entire spacing between the two surfaces, and between the polyurethane sealant and the faying surfaces themselves.

18 Claims, 1 Drawing Sheet

SOLID SEALANT WITH ENVIRONMENTALLY PREFERABLE CORROSION RESISTANCE

RELATED APPLICATIONS

This is a divisional of Ser. No. 09/198,741 filed Nov. 24, 1998 now U.S. Pat. No. 6,315,300.

FIELD OF THE INVENTION

Sealing against passage of fluids- gases or liquids-between two faying surfaces which confront one another with a layer or layers of solid sealant in contiguous and continuous fluid-sealing contact with the surfaces, which include an environmentally preferable corrosion resistance component.

BACKGROUND OF THE INVENTION

Sealing against the passage of fluids- gases or liquids-between faying surfaces is a very old art. "Faying" surfaces are those which directly abut each other, or which almost abut each other with an intermediate body between them such as a sealant. Built-up structures are replete with faying surfaces. The substrates bearing the surfaces are customarily joined together by fasteners such as rivets or threaded combinations whose purpose is to hold them against separation and to limit or prevent relative shear movement between them.

Especially in structures which are subject to a variety of environments such as substantial temperature change, and deflection due to bending or vibration, relative movement and separation between local regions of confronting faying surfaces cannot be completely prevented. Thus even those flat surfaces which are practically attainable when brought together will in use permit leakage of fluid between them.

This is a tolerable situation where the confinement of a fluid is not required. Many faying surfaces are joined without regard for sealing. However in applications such as fuel tanks, leakage of fuel is not tolerable. In aircraft fuselages, leakage of air from a pressurized cabin must at least be minimized. There are numerous other examples in aircraft and spacecraft as well as in ground based structures where fluid containment (gas or liquid) in a built-up structure is required.

This is an old problem, and it has been solved in various ways which utilize sealants applied to appropriate parts of the structure. With rivets or fasteners in areas where sealing is critical, beads of sealant are applied around exposed edges of adjacent surfaces, often in the form of wet sealants which cure or dry after assembly. The techniques for application and subsequent clean-up are both expensive and labor intensive, and complicate the assembly, maintenance and repair of the structure.

In aircraft construction, a wet layer of sealant is often placed between the faying surfaces at the time they are joined together, and the sealant cures after the assembly is completed. The process is designed in such a way that the entire interstitial area will be filled. To assure this, an excess of sealant is applied before the surfaces are brought together. Some of the sealant is expelled from between the surfaces when they are joined, and their excess sealant must be removed from the adjacent area around the sealed edges. The problems created by the excess sealant are not trifling. The surrounding area becomes a mess that has to be cleaned up, and all excess sealant must be carefully removed. If the sealant contains toxic additives such as chromates, the toxic excess requires careful disposal methods which are expensive. The expensive disposal extends to auxiliary items such as the cloth used for removal, brushes used for application, and the like. Worker protection must be provided against contact with such a sealant, requiring the use of masks and gloves. Solvents such as 1,1,1-trichloroethane and ether solvents which are used for the cleanup bring their own hazards.

In order to assure adequate filling of the interstitial region, it is not sufficient merely to provide an excess of sealant. It is also necessary to provide a uniform excess. This requires a further tooling step to rake and trim the exposed wet surface to a uniformly thick area of a configured shape.

These labor intensive procedures are costly. They must be performed a reasonably short time before assembly so the sealant remains fluid while the assembly is completed. This is a serious limitation on the freedom to schedule production, because the surfaces cannot be prepared long before assembly and then wait their turn for use.

The above labor and economic problems and shortcomings of a sealant which is applied wet at the time of assembly are severe. They also involve the economic problems of material waste and structural weight penalties. The waste of expensive sealant material which must be wiped up and disposed of is the lesser of these.

Of far greater consequence is the weight penalty. It has been calculated that on a large aircraft such as the C-17, the use of the dry sealant system of this invention can reduce the total sealant weight required by about 800 pounds compared to the weight of a wet sealant even when the wet sealant is applied in an optimum manner. It should be remembered that weight is an extremely expensive quantity in aircraft and spacecraft, because each pound and structure to support it requires fuel to raise it every time it is lifted. It has been estimated that in aircraft, each pound costs about hundreds of dollars over the useful life of the aircraft.

A sealant which can be applied well before assembly and handled while dry can be made to closer tolerances, without applying excess sealant to assure that there is enough. This potentially avoids the most troublesome and costly problems. In addition, the part can be prepared long before it is needed for assembly, and can be used when it is most convenient to the production schedule.

However, attempts to coat one or both of the surfaces, drying the coating, and then joining them has not previously been successful. The reasons reside in the stringent conditions the sealant layer must fulfill.

To be successful for its intended purpose the sealant must be dry so that it can physically be handled without changing the shape of the sealant layer, or fouling the surroundings. It must not extrude to become a nuisance after assembly, and the sealant must ultimately come into complete conformity with both surfaces. The surface to which it is directly applied will assuredly be fully abutted. However, the exposed other surface of the dry sealant must effectively contact and engage the other surface (or the exposed surface of an opposite sealant layer). Accordingly, in the substantial total thickness required for a practical sealant, often bridging surfaces from between about 0.005 and 0.01 inches apart, down to near contiguity, the dry sealant must be deformable, but not be liable to substantial cold flow. This is assured by control of the physical properties of the cured sealant.

In order to be practical, the thickness of the dry layer must be consistent and readily applied. Surfaces to be covered come in a wide range of sizes and configurations, from long spars and wide panels to intersections with tight corners.

While techniques such as spraying, brushing, rolling and flooding can in many situations effectively be used, in general from the point of view of production efficiency, spraying is the preferred method. For this reason sprayable coatings are the most desirable manner of application.

In order to be practical for production purposes the uncured sealant should not contain any solvents or volatile materials (although in some cases the use of water as a solvent might be acceptable). If solvents are present they present ventilation problems, as well as fire and explosion hazards. In addition solvent evaporation from the film can lead to pinholing and film shrinkage with subsequent possible development of leaks.

The sealant must be strongly adherent to its substrate and be compatible with both its substrate, with other sealant compounds which are used to form fillets or beads, and with tackifiers and other adhesives if they are used. Such other compounds are characteristically applied as a backup as reassurance against leakage through the spacing between the faying surfaces, and to resist corrosion when a corrosion resistant substance is provided as an additive.

While a heat curable sealant is useful in this invention, the application of curing temperatures to many substrates could cause warpage or other damage to a substrate such as an aircraft panel. It is preferable for the sealant to cure at room temperature, for example between about 60 degrees F. and about 120 degrees F.

A substantial pot life is desirable when a pre-mixed liquid sealant is applied. The term "pot life" is less meaningful if the sealant is a multiple component mixture that is mixed in a dispensing nozzle. In this case cure time after application is a more appropriate term. While cure times can vary from minutes to a week or so, a cure time not much longer than about 16 hours is most practical in a manufacturing venue. An overnight cure of about 16 hours is about as long as a manufacturing operation is likely to tolerate. After the cure is completed, there should be no limitation on how long the sealant may remain exposed. Certainly it should not be so long as to require a large number of parts to be treated in advance and held in inventory while the sealant cures.

The long list of constraints continues with the requirement that the sealant resist corrosion and solvent attack by many common substances. These substances include such frequently-encountered examples as air, water 1,1,1-trichlorethylene, halogenated hydro carbons, aromatic solvents such as toluene, common solvents such as ketones (MEK), esters (butyl acetate), alcohols (methyl and ethyl), and hydrocarbon fuels such as JP8.

Production of a continuous and uniform sealant layer is essential. For example, some polymer systems are very sensitive to the presence of water, which can generate void inclusions. The sealant must be readily mixed in convenient apparatus in a conventional manufacturing environment.

Other requirements, especially for aerospace operations in which the use of this invention will be most frequent is the ability to withstand and operate over a wide range of temperatures, generally between about −65 degrees F. and about 250 degrees F. or wider. The capacity to be repaired if damaged is essential. Suitability for repair requires that a later-applied application of the sealant can form a continuous bond with a contiguous remaining layer of undamaged sealant.

In view of this array of requirements, which steadily become more demanding as the complexity, size, and ambient and physical conditions become more severe, it is not surprising that the concept of utilizing dry sealant layers to seal between faying structures has been neglected. The use of more expensive, complicated, and labor intensive sealing techniques utilizing wet sealants which are later cured in place have become the accepted mode despite their cost and other disadvantages.

It is another object of this invention to simplify and reduce the cost of a reliable seal between faying surfaces, at the same time providing one which is more reliable and much less likely to require repair.

It is yet another object of this invention to provide structure comprising a pair of assembled substrates with faying surfaces bridged by a cured sealant layer according to this invention.

Sealants of this type are often applied to surfaces that are subject to corrosion by the environments in which they are used. Metal aircraft structures made of materials such as aluminum, titanium and composites are examples. To counter this risk, sealants customarily include a corrosion resistant component. By far the most extensively used substances for this purpose are metal chromates, particularly strontium chromate, zinc chromate, and barium chromate, and their mixtures. These function well for this purpose, and heretofore have enjoyed widespread and usually uncritical acceptance.

However, chromates themselves have become environmentally objectionable. Their handling in manufacturing and disposal operations has become more regulated and troublesome. In some applications the mere presence of chromates per se has become an issue. Still, the protection of surfaces intended to remain in service for many years, even decades, and in which there is very limited access for inspection, and repair is excessively expensive even where it is possible, the use of adequate corrosion resistance components is essential. For this purpose chromates are much to be preferred, their effectiveness for very extending periods of time having been proved long ago.

It is another object of this invention to provide a non-chromate corrosion resistant element for sealants, especially effective for sealants between faying surfaces, but also effective in other types of coatings as well.

BRIEF DESCRIPTION OF THE INVENTION

This invention provides the faying surface of one or of both of a pair of substrates with a layer of solid sealant which is adherent to at least one of the respective surfaces. The substrates are fastened together by mechanical means so the faying surfaces compress the sealant between them to form a fluid seal across the entire spacing between the two surfaces, and between the sealant and the faying surfaces themselves.

According to this invention the sealant consists essentially of an organic polymer having the following physical properties:

(1) Sprayability in its liquid pre-cured condition, and the ability to cure to a solid at room temperatures.

(2) Resistance to deterioration and solvent attack, and ability to seal against passage through. it, and between it and the faying surfaces, of air, water, common solvents and hydrocarbon fuels.

(3) Temperature tolerance to resist thermal decomposition, and to provide sealing properties at temperatures between about −65 degrees F. and about 250 degrees F.

(4) Compatibility with substrate surfaces of metal such as aluminum alloys, titanium alloys, steels, and structural composite materials.

(5) Adequate deformability to accommodate surface irregularities in the substrates which may be exasperated by temperature excursions and deformation.

(6) Compatibility with sealants customarily used to form beads and fillets.

(7) Ability to join and form a continuous seal with the edges of a previously deposited and cured layer of a similar or identical sealant material.

(8) Inclusion of a corrosion resistant component which is not a chromate.

A sealant for use with this invention comprises an organic polymer possessing the foregoing physical and chemical properties, in which the physical properties are derived from a molecular structure which includes three-dimensional cross-linkage to form a structural lattice to enhance heat and solvent resistance. Numerous polymeric systems may be employed, including polyurethanes, polyesters, epoxies, acrylics, synthetic rubbers, and natural rubbers. While all may find utility in many or most applications, the polyurethanes involve the fewest difficulties in their preparation and application, which are as well to avoid. Further, they may readily formulated to provide the above features over a wide range of values. Accordingly, while other systems fall within the scope of this invention, polyurethanes are much to be preferred, and will be emphasized in this specification. A corrosion resistant component, a borate, preferably zinc borate, is included.

A structural assembly according to this invention comprises a pair of substrates mechanically joined with their faying surfaces bridged by a layer of said sealant.

The above and other features of this invention will be fully understood from the following detailed description and the accompanying drawings, in which:

DETAILED DESCRIPTION OF THE INVENTION

Figure 1:
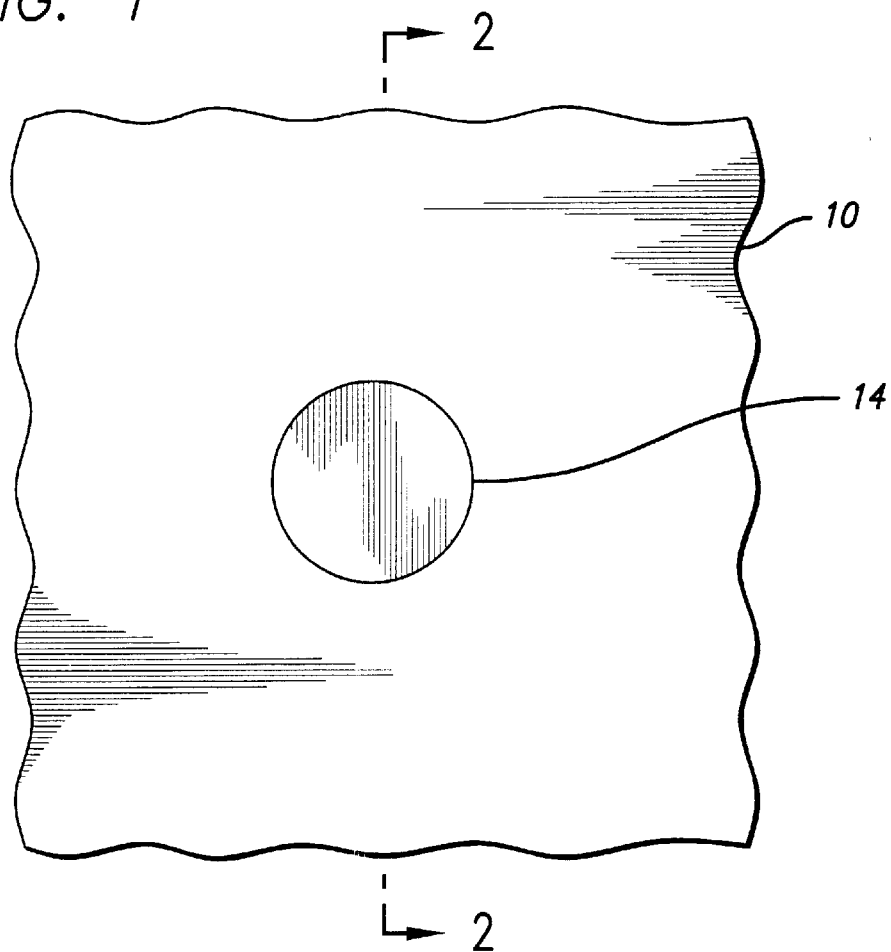
FIG. 1 is a fragmentary plan view of an assembly of faying surfaces and sealant according to this invention.
Figure 2:
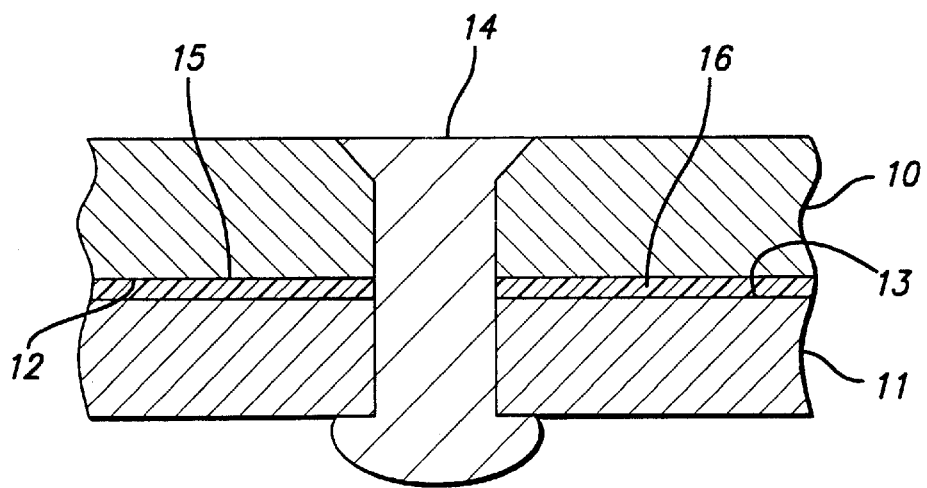
FIG. 2 is a cross-section taken at line 2—2 in FIG. 1.

In the drawings a pair of substrates 10, 11 having faying surfaces 12, 13, are joined together by a fasteners 14 or other mechanical means. A rivet is shown. Instead threaded pin-collar assemblies could readily be used. A layer 15 of sealant according to this invention is placed between them to seal the spacing 16 between them.

The substrates often will be metal sheets or flanges, formed of aluminum alloys, titanium alloys, or steels. The fasteners may be of any suitable type such as rivets and threaded combinations of pins and collars. The identity of the substrates and fasteners are not limitations on the invention, but are given only as illustrative examples of the uses to which this invention can be put.

While a layer of sealant can be applied to both surfaces 12 and 13, this will usually be an unnecessary duplication of labor. If a layer is applied to both surfaces, each must be thinner than a layer applied to only one surface. In that event, each layer will be contiguous to and adherent to its own respective surface. After assembly, the exposed surface of each layer will conform to the exposed surface of the other to complete the seal, instead of conforming to the other faying surface. This construction, while not preferred, is within the scope of this invention. It is in the nature of this sealant to make a closed compressive seal. While the previously exposed surfaces of the sealant will not ordinarily fuse with each other, their mutual resistance to flow and common deformability will assure a fluid-tight seal between them.

When only one layer is used on only one of the faying surfaces, the sealant adheres to its respective surface, and is pressed against the other surface by the assembly procedures. The cured sealant material resists cold flow, and feels slightly soft, preferably having a Shore A hardness between about 30 and about 70. This feature aids in maintaining a prevailing sealing force. In modern compressive rivet practice in the aircraft the sealant will usually be compressed between the substrates, and then the rivet will be driven. While the rivet may thereafter elongate a bit after the setting forces are removed, it still will maintain some compression on the sealant. When a threaded fastener is used, it will maintain a prevailing compression force on the substrates, and thereby on the sealant.

Each of the requisite properties of the sealant, both before and after curing, has a substantial range of acceptability. The task of designing the sealant therefore becomes one of providing it with each of the properties within the acceptable range. Evidently there can be at least several sealant compositions whose properties will fall within the selected limit ranges. Any of these can be used, but the selection among them will often be determined by their convenience in formulation and use, and in minimized requirements for control of environmental conditions during mixing and application, and of course minimum toxicity.

Although other systems are useful and acceptable, generally the urethanes will be much preferred.

Although isocyanates are generally toxic and many monomeric isocyanates are quite volatile, their product of reaction with polyols is much less toxic and readily dealt with. Polyurethanes cured from suitable starting materials can be completely acceptable, and are the preferred embodiment of this invention.

As design (selection) criteria, for solvent resistance, resistance to cold flow under the anticipated temperature conditions, and proper hardness, a suitable amount of cross-linking is necessary. However, if the cross-linking is too great, the cured material will be too hard and too brittle for use. If there is insufficient cross-linking there will be insufficient resistance to solvents or cold flow.

In order to formulate a sealant with the desirable properties as described above it is necessary to strike a proper balance between the amount of cross linking of the final polymer and the chain lengths between cross links in the backbone of the molecule. Too much cross linkage leads to hard, brittle polymers with insufficient flexibility to perform the required sealing as described above. Too little cross linking leads to polymers which show poor solvent and chemical resistance as well as poor resistance to cold flow or creep.

Cross linking is attained in polyurethanes by using multi-functional monomeric starting materials (isocyanates or polyols). In this case multi functional is defined as a functionality greater than two. In order to produce a long chain polymer both the isocyanate and polyol materials must have a functionality of at least two.

In addition to sufficient cross-linking, the choice of chain length is important for the properties of softness and flexibility. Here one considers that if long chain monomers are used to provide softness and flexibility, they must be highly functional. If shorter chain monomers are used, the functionality can be decreased, but there still must be sufficient chain length for the cured sealant to have the desired physical properties.

There are many possible routes to producing a polymer with the correct balance or cross linking and chain length. For example long chain diols can be cross linked with suitable amounts of short chain triols (or tetraols, etc.). Conversely long chain triols can be used to cross link short or medium chain length diols.

With the foregoing in mind, the formulator of sealants according to this invention will select appropriate chain lengths and functionalities, and mix the reactants prior to application, or mix them as they are being applied, perhaps in a spray gun.

Adjustments to the various properties may be made by selecting longer or shorter chains and greater or lesser functionalities.

Additives for various purposes may be including in the precured mix, for example corrosion resistant compounds and catalysts.

Formulations according to this invention do not use chromates for corrosion resistance. Instead borates, preferably zinc borate, will be used for this purpose. Zinc borate in amounts between about 3% and 30% by weight of the formulation is useful. Its preferred range is between about 6% and about 12% by weight. Percentages less than about 6% are useful, but at least that amount is to be preferred. Amounts above about 12% do not appear to offer enough greater effect to justify their use. About 6%–8% will generally be selected within the preferred range.

Conventional catalysts may be used. Organic metal salts, especially salts of tin, and mercury are frequently used. Amines are also useful catalysts. Tertiary amines provide for a fast cure that is difficult to control. Secondary amines do not result in a fast a cure and are well-regarded for the purpose. The most commonly used amine catalysts are primary amines.

Any corrosion resistant additive and any catalyst which is not deleterious to the composition is within the scope of this invention. The above being merely the preferred examples.

With the foregoing in mind, the following illustrative examples are given. The preferred polymer system is a polyurethane.

The various polyols can be obtained as urethane grade materials from a variety of suppliers. The following table shows a few examples of some of the commercially available materials. This table is not intended to be complete, but only shows a sample of the wide variety of available materials.

| Product Name | Supplier | Functionality (Type) | Approx. Mol. Wt. |
| --- | --- | --- | --- |
| Multranol 9121 | Bayer | 2 (diol) | 425 |
| Poly G 20–265 | Olin | 2 (diol) | 425 |
| Poly G 20–112 | Olin | 2 (diol) | 1000 |
| Multranol 9109 | Bayer | 2 (diol) | 1000 |
| Multranol 3600 | Bayer | 2 (diol) | 2004 |
| Poly G 20–56 | Olin | 2 (diol) | 2000 |
| Poly G 20–28 | Olin | 2 (diol) | 4000 |
| Multranol 9195 | Bayer | 2 (diol) | 4000 |
| Multranol 9133 | Bayer | 3 (diol) | 160 |
| Poly G 70–600 | Olin | 3 (triol) | 282 |
| Poly G 30–280 | Olin | 3 (triol) | 615 |
| Multranol 9157 | Bayer | 3 (triol) | 673 |
| Multranol 9144 | Bayer | 3 (triol) | 1122 |

-continued

| Product Name | Supplier | Functionality (Type) | Approx. Mol. Wt. |
| --- | --- | --- | --- |
| Poly G 30–168 | Olin | 3 (triol) | 1000 |
| Poly G 30–112 | Olin | 3 (triol) | 1500 |
| Multranol 9180 | Bayer | 3 (triol) | 1503 |
| Multranol 9187 | Bayer | 3 (triol) | 2805 |
| Poly G 30–56 | Olin | 3 (triol) | 3000 |
| Poly G 30–42 | Olin | 3 (triol) | 4000 |
| Multranol 9168 | Bayer | 3 (triol) | 3740 |
| Multranol 9181 | Bayer | 4 (tetraol) | 291 |
| Multranol 9173 | Bayer | 5.5 | 671 |
| Multranol 9185 | Bayer | 6 | 3366 |

The above products are well-known. Their features which are important to this invention are shown in the foregoing table. "Bayer: refers to Bayer Corporation, 100 Bayer Road, Pittsburgh, Pa. 15205-9741. "Olin" refers to Olin Industries.

By combining the proper mixture of high and low molecular weight polyols, and by using a variety of ratios of diols to polyols with functionalities greater than 2, a variety of urethane polymers with different degrees of cross linking and various physical properties can be obtained. For example backbone chains prepared from high molecular weight diols (to give flexibility) can be cross linked with low molecular weight triols to result in urethane polymers with the desired physical properties and chemical resistance. Conversely lower molecular weight diols can be cross linked with higher molecular weight triols and/or tetraols to also obtain a desirable combination of properties.

The above discussion has concerned ways of formulating polyurethanes with the desired properties by the proper choice of hydroxy compounds. An equally powerful method of obtaining a variety of properties can be used by choosing the proper polyisocyanate. However in practice the properties of the polymer are generally determined by the choice of hydroxyl compounds, and the isocyanates are chosen for other considerations.

It has been found that in general the strongest but least flexible polymers result when aromatic isocyanates are used for their preparation. Conversely more flexible but less heat resistant polymers result when aliphatic isocyanates are used for their preparation. Intermediate properties are obtained when cycloaliphatics are used. Even more important than the influence of physical properties by the isocyanates is the resistance to yellowing and weathering when the polymers are exposed to ultra violet radiation such as occurs in normal outdoor exposure. Polyurethanes prepared from aromatic isocyanates show poor resistance to weathering and yellowing whereas those prepared with aliphatic or cycloaliphatic isocyanates exhibit good weathering characteristics.

Another important consideration when choosing the isocyanate used for making a polyurethane is raw material cost. In general the aromatic isocyanates are the least expensive and the cycloaliphatic ones are the most costly.

As stated above, isocyanates are generally toxic, and the aromatic isocyanates are more toxic than the other types. The primary danger encountered when working with isocyanates is from inhalation of the vapors. The risk from exposure to vapors can be dramatically reduced if instead of using monomeric isocyanates, their volatility is reduced by using them in a polymeric form. Polyisocyanates are commercially available as are isocyanate terminated prepolymers. These materials can be used as substitutes for all or part of the monomeric isocyanates for the preparation of polyurethanes.

As with the hydroxy compounds, isocyanate materials especially manufactured for the preparation of polyurethanes are commercially available from a variety of manufacturers. A few of the suitable materials available from Bayer are listed below.

Mondur ML: Aromatic monomeric diisocyanate.

Mondur TDS: Aromatic monomeric diisocyanate.

Desmodur W: Cycloaliphatic monomeric diisocyanate.

Mondur MR: Aromatic polymeric diisocyanate.

Baytec ME-040: Isocyanae terminated polyether prepolymer.

Baytec ME-090: Isocyanate terminated polyether prepolymer.

Baytec MS-041: Isocyanate terminated polyester prepolymer.

Baytec WE-180: Isocyanate terminated aliphatic prepolymer.

In addition the aliphatic hexamethylene diisocyanate can be purchased commercially.

The foregoing isocyanates and polyols may be obtained from the Bayer Corporation. Further information regarding them will be found in its publication entitled "Polyurethane Raw Materials Product Index—Polyurethane Products", copyright 1996 which is incorporated herein in its entirety in this invention for such information, and a copy is being filed along with this application.

The general method for formulating practical polyurethanes is to first choose the isocyanate portion of the composition based first on the requirements of resistance to weathering and then on the other factors such as cost, toxicity, method of application of the final composition etc. Once the isocyanate has been chosen, the desirable physical properties of the final polymer are obtained by the proper choice of the hydroxy components as described above.

The following are examples of suitable formulation of polyols and isocyanates together with other ingredients, which when mixed will cure to form a useful sealant according to this invention in a suitable period of time. Examples 1–6 are urethane systems. Percentages are by weight. The polyols and isocyanates are more completely described in the foregoing lists. DBTDL identifies dibutyl tin dilaurate, which is provided as a catalyst.

EXAMPLE 1

| Poly G 20–56 | 38.85% |
| Multranol 9109 | 38.85% |
| Mondur MR | 16.3% |
| DBTDL | 0.01% |
| Zinc Borate | 6% |

EXAMPLE 2

| Poly G 20–56 | 70.7% |
| Poly G 70–600 | 6.7% |
| Mondur FL | 18.6% |
| DBTDL | 0.01% |
| Zinc Borate | 4.0% |

EXAMPLE 3

| Multranol 9109 | 47.1% |
| Poly G 30–280 | 19.3% |
| MRS-4 | 25.6% |
| DBTDL | 0.01% |
| Zinc Borate | 8% |

EXAMPLE 4

| Multranol 9195 | 76.8% |
| Multranol 9133 | 4.1% |
| Mondur MR | 16.1% |
| DBTDL | 0.015% |
| Zinc Borate | 3% |

EXAMPLE 5

| Poly G 20–56 | 44.8% |
| Multranol 9185 | 25.1% |
| MRS-4 | 12.1% |
| DBTDL | 0.01% |
| Zinc Borate | 18% |

EXAMPLE 6

| Desmophen 2000 | 42.5% |
| Multranol 9144 | 31.7% |
| Desmodur W | 19.8% |
| DBTDL | 0.02% |
| Zinc Borate | 6% |

It is well known to those versed in the techniques of successfully producing polyurethane films and other products (with the exception of foams) that it is essential to exclude water from the ingredients or the end result will be that soft and weak materials which are full of bubbles. The reason for this is that isocyanates react with water to produce carbon dioxide which ends up as bubbles in the final product. For this reason a variety of techniques have been developed to keep water out of the reactants.

The most common way for water to contaminate the reactants is for it to be absorbed by them from the surrounding air. Unless the air is dried to an extremely low moisture content (for example a relative humidity of 10% or lower) the polyols used for the preparation of the polyurethanes will absorb sufficient water vapor from the moist air to produce an inferior product. With regard to the isocyanate component of the formulation, the reaction with water referred to above not only produces the deleterious bubbles, but it also "weakens" the isocyanate so that the stoichiometry is thrown off balance, and a soft weak product results. It is well known that in order to produce strong high molecular weight polyurethane polymers, equimolar amounts of hydroxyl and urethane groups must be present in the reaction mixture.

Since in the presence of a polymerization catalyst (metal salts, amines, etc.) the hydroxyl and isocyanate materials will react to form a polyurethane, it is essential that these two components be kept separately until the time that they are purposely allowed to react to form the final desired product.

As was stated above a variety of techniques have been developed to keep water from the reactants. If the polyols and isocyanates are purchased commercially, they are shipped in sealed containers and are blanketed by an atmosphere of dry nitrogen. When these containers are opened for use the must be opened in a dry atmosphere, or the local surrounding environment must be opened in a dry nitrogen (or air) during the pouring or transfer operation. The materials must be transferred into containers which have been dried, and which have a dry atmosphere. After the reactants have been transferred to these containers, a dry atmosphere must be maintained by flooding with dry gas before closing and sealing. The opened containers from which the reactants have been poured must also be flooded with dry gas before resealing. One technique which has often been used successfully is to transfer the materials from one container to another by the use of vacuum. A slight vacuum is drawn in the receiving container, and the material is transferred from the storage container to the receiver by "blowing" it from the one vessel to the other by taking advantage of the pressure differential.

By the use of the various techniques just described, the products given in the above examples are prepared as follows: The polyol component (A component) is prepared by mixing together the polyols given in each example along with the polymerization catalyst (DBTDL in the examples given) and the chromate corrosion inhibitors. If the material is to be sprayed to form a thin film, the chromates must be milled into a polyol component using a suitable mill such as a ball mill, sand mill or three roll mill to a paste in which the pigment is finely dispersed. Generally milling the paste to a Hegmen gauge reading of 6 or higher results in a satisfactory dispersion. Care must be taken during the milling process to ensure that no water is allowed to contaminate the paste.

The isocyanate (B component) is weighed in the proper amount, and the A and B components are mixed together just prior to application. The mixed product is allowed to polymerize to cure to the final product. In the examples given an overnight cure will result in a satisfactory material. The cure can be slowed up or hastened by adjusting the amount or type of catalyst. For example the cure can be slowed down by decreasing the amount of tin catalyst used, or by substituting an amine catalyst for the tin catalyst. The cure can be accelerated by increasing the amounts of tin catalyst, using a different organo tin salt (for example dibutyl tin dichloride) or by using an amine catalyst along with the DBTDL.

The final mixed product is applied to the substrate by a suitable technique such as brushing, spraying, drawing down a film, trowelling etc. As stated above spraying is usually the preferred method of application.

Although the preferred polymers to use for this invention are polyurethanes, any polymer which can be formulated to give a soft flexible material with the correct physical properties to show adequate solvent resistance, temperature resistance, etc., as described above can be used. Satisfactory useful polymer types in addition to the polyurethanes include polyesters, epoxies, acrylics,, silicones, natural and synthetic rubbers, polybutadienes and certain vinyl materials.

This invention is not to be limited by the embodiments shown in the drawings and described in the description, which are given by way of example and not of limitation, but only in accordance with the scope of the appended claims.

I claim:

1. A method of forming a fluid impermeable seal between the faying surfaces of two metallic substrates with a polyurethane sealant, the method comprising the steps of:

applying a layer of the polyurethane sealant in a pre-cured liquid condition to at least one of the faying surfaces, the polyurethane sealant comprising a copolymer of an isocyanate and a polyol, the isocyanate and polyol when mixed before curing containing a dibutyl tin dilaurate catalyst in an amount predetermined to cause an intended cure rate, the polyurethane sealant including zinc borate as a corrosion resistance component in amounts by weight between about 3% and about 30% of the polyurethane sealant, and wherein the isocyanate and polyol when mixed before curing contain the zinc borate;

permitting the layer of polyurethane sealant to cure to a dry solid; and mechanically fastening the metallic substrates together such that the faying surfaces thereby compress the polyurethane sealant between them to form a liquid impermeable seal.

2. The method according to claim 1 further comprising the steps of:

preparing the polyurethane sealant by mixing an isocyanate and a polyol to form a copolymer;

adding a dibutyl tin dilaurate catalyst to the isocyanate and polyol when mixed before curing in an amount predetermined to cause an intended cure rate; and adding a metal borate corrosion resistance component to the polyurethane sealant.

3. The method according to claim 1, wherein the zinc borate is in amounts by weight between about 6% and about 12% of the polyurethane sealant.

4. The method according to claim 2, wherein the metal borate is added to the isocyanate and polyol when mixed before curing.

5. A method of forming a fluid impermeable seal between the faying surfaces of two metallic substrates with a polyurethane sealant, the method comprising the steps of:

preparing the polyurethane sealant by mixing an isocyanate and a polyol to form a copolymer;

adding a dibutyl tin dilaurate catalyst to the isocyanate and polyol when mixed before curing in an amount predetermined to cause an intended cure rate;

adding zinc borate as a corrosion resistance component to the isocyanate and polyol when mixed before curing in amounts by weight between about 3% and about 30% of the polyurethane sealant;

applying a layer of the polyurethane sealant in a pre-cured liquid condition to at least one of the faying surfaces;

permitting the layer of polyurethane sealant to cure to a dry solid; and mechanically fastening the metallic substrates together such that the faying surfaces thereby compress the polyurethane sealant between them to form a liquid impermeable seal.

6. The method according to claim 5, wherein the zinc borate is in amounts by weight between about 6% and about 12% of the polyurethane sealant.

7. The method according to claim 1, wherein the layer of polyurethane sealant is permitted to cure to a dry solid at room temperature.

8. The method according to claim 7, wherein the cure time is not less than about 10 minutes and not more than about 16 hours.

9. The method according to claim 1 wherein both the isocyanate and polyol have at least two functionalities.

10. The method according to claim 1 wherein the polyurethane sealant when cured has a Shore A hardness between about 30 and about 70.

11. The method according to claim 1 wherein the polyurethane sealant when cured is impermeable and resistant to chemical attack by air, water, common solvents and petroleum fuels, resistant to compressive cold flow but deformable to conform to an abutting one of the faying surfaces or with a layer of similar sealant on the other of the faying surfaces, and flexible and resistant to a temperature range between about −65 degrees F. and about 250 degrees F.

12. The method according to claim 1, wherein the polyurethane sealant is applied to the faying surface by spraying.

13. The method according to claim 1, wherein the polyurethane sealant is applied to the faying surface by brushing.

14. The method according to claim 1, wherein the polyurethane sealant is applied to the faying surface by drawing down a film.

15. The method according to claim 1, wherein the polyurethane sealant is applied to the faying surface by trowelling.

16. The method according to claim 1, wherein the polyurethane sealant in a pre-cured liquid condition is applied to both faying surfaces.

17. The method according to claim 2, wherein the isocyanate and polyol are mixed before applying the polyurethane sealant to the faying surface.

18. The method according to claim 2, wherein the isocyanate and polyol are mixed while they are being applied the faying surface.

* * * * *